(12) United States Patent
Srinivasan et al.

(10) Patent No.: US 7,039,604 B1
(45) Date of Patent: May 2, 2006

(54) MULTI-VENDOR INTEGRATION PROCESS FOR INTERNET COMMERCE

(75) Inventors: Subbu Srinivasan, Fremont, CA (US); Virginia M. Thompson, Sunnyvale, CA (US); Victor Alejandro, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 470 days.

(21) Appl. No.: 09/784,875

(22) Filed: Feb. 15, 2001

(51) Int. Cl.
*G06F 17/60* (2006.01)

(52) U.S. Cl. .............................. 705/26; 705/27
(58) Field of Classification Search ............... 705/26
See application file for complete search history.

(56) References Cited

U.S. PATENT DOCUMENTS

| | | | | |
|---|---|---|---|---|
| 5,040,142 A | * | 8/1991 | Mori et al. | 715/511 |
| 5,315,504 A | * | 5/1994 | Lemble | 700/90 |
| 5,758,327 A | * | 5/1998 | Gardner et al. | 705/26 |
| 5,774,551 A | * | 6/1998 | Wu et al. | 713/155 |
| 5,870,717 A | * | 2/1999 | Wiecha | 705/26 |
| 5,937,393 A | * | 8/1999 | O'Leary et al. | 705/21 |
| 6,052,669 A | * | 4/2000 | Smith et al. | 705/26 |
| 6,141,653 A | * | 10/2000 | Conklin et al. | 705/80 |
| 6,167,383 A | * | 12/2000 | Henson | 705/26 |
| 6,289,351 B1 | * | 9/2001 | Doi et al. | 707/100 |
| 6,367,013 B1 | * | 4/2002 | Bisbee et al. | 713/178 |
| 6,853,978 B1 | * | 2/2005 | Forth et al. | 705/26 |
| 2001/0014878 A1 | * | 8/2001 | Mitra et al. | 705/26 |
| 2002/0042755 A1 | * | 4/2002 | Kumar et al. | 705/26 |
| 2002/0077935 A1 | * | 6/2002 | Rajagopalan et al. | 705/27 |
| 2002/0087423 A1 | * | 7/2002 | Carbrey Palango et al. | 705/26 |
| 2002/0188524 A1 | * | 12/2002 | Shimizu | 705/26 |
| 2002/0198967 A1 | * | 12/2002 | Iwanojko et al. | 709/220 |
| 2003/0074269 A1 | * | 4/2003 | Viswanath | 705/26 |
| 2003/0200469 A1 | * | 10/2003 | Johnson | 713/202 |

FOREIGN PATENT DOCUMENTS

| | | | |
|---|---|---|---|
| EP | 0899672 | * | 3/1999 |
| WO | WO 98/10360 | * | 3/1998 |
| WO | WO 01/73561 | * | 10/2001 |

OTHER PUBLICATIONS

Pereira, Electronic Business Asia, Electronic Commerce:Casting a wider net, Sep. 1999 issue, downloaded from http://www.eb-asia.com/EBA/issues/9809/0998coverstory.htm.*

(Continued)

*Primary Examiner*—Katherine Mitchell (57) ABSTRACT

A method for automatically processing electronic customer orders for configurable products. In one embodiment, a web site that is operable to access a vendor ordering application receives a user who is electronically transferred from a web site or computer that is operable to access an electronic procurement application. Next, the vendor ordering application allows creation of an electronically placed order for a configurable product. The vendor ordering application determines whether any product is configured properly; however, the order will be allowed to proceed even if all the required order processing information is not yet provided. The vendor ordering application then transfers an electronic copy of the incomplete order to the electronic procurement application. Next, the vendor application receives an approval for the order, along with the rest of the required order information. At this point, the vendor application checks to see if the purchase order information is complete and valid.

13 Claims, 6 Drawing Sheets

OTHER PUBLICATIONS

Cisco Systems, Cisco Networked Commerce Solutions, Lit. #884801 datted Feb. 1998, downloaded from http://www.cisco.com/warp/public/cc/serv/mkt/nc/netcm_pl.pdf, 5 pages.*

Ernst & Young Creating value Through Global Networked Business, 16 pages, Jun. 1998, Downloaded from www.cisco.com/warp/public/cc/so/bzso/ibsg/cval_bc.pdf.*

Cisco, Data Sheet, Cisco's Networked Commerce Ordering Application, 4 pages, Aug. 15, 2001, downloaded from www.ciscosystems.co.nz/warp/ public/cc/serv/mkt/nc/ncord_ds.htm.*

Wuebker et al., Cisco Systems: The Internetworking Company of the Future, Version 2.0, May 1, 1998, 13 pages, downloaded from www.ite.poly.edu/htmls/Cisco_case_3.html.*

Cisco, Cisco Update: Refining the Global Networked Business, 22 pages, undated, downloaded from www.transcendstrategy.com/html/ downloads_transcend/articles/cisco.pdf.*

Cisco Systems, Infoblast, "How to Order", undated, 12 pages, downloaded from http://www.sistech.co.id/Infoblast/disguide/policies/order.html.*

Mitchell, Examiner's Affdavit, Notarized Mar. 7, 2005, 1 page.*

Aragon-Stemel "Inside the Cisco Website," Nov./Dec. 1997, Internet Computing Online, from www.computer.org/internet/arch.htm, 8 pages+8 pages of listing of articles showing publication date.*

Goulde, "Networking Caching Guide", Patricia Seybold Group, Mar. 1999, 45 pages including cover.*

W3C Organization, Extensilble Markup Language (XML) 1.0, Feb. 10, 1998, from www.w3.org/TR/1998/REC-xml-19980210; 34 pages.*

Release Notes for Cisco Cache Software, Release 2.4.0, Cisco Systems, Inc., Jan. 8, 2000; 16 pages including cover.*

Wuebker et al., "Cisco Systems: The Internetworking Company of the Future" Institute for Technology and Enterprise, Version 2.0, May 1, 1998, 11 pages, esp. pp. 7-10.*

* cited by examiner

MULTI-VENDOR INTEGRATION PROCESS FOR INTERNET COMMERCE

FIELD OF THE INVENTION

The present invention relates to the field of Internet commerce. Specifically, the present invention relates to a method for automatically processing orders for configurable products in a multi-vendor environment.

BACKGROUND ART

The field of processing customer orders has seen many changes in recent years. In particular, advances in electronic communication such as the Internet suggests the potential for more rapid processing of electronically placed orders. However, problems still exist in processing the orders efficiently. In particular, order processing may be delayed unnecessarily because of inefficiencies and hold-ups with conventional order-processing systems.

An emerging system for processing customer orders is electronic procurement applications. These conventional systems provide for a way for businesses to order products from multiple on-line vendors by initially accessing a web site for the electronic procurement application. For example, an electronic procurement application allows a company's purchasing agents to access the electronic procurement application, select a vendor web site to be electronically transferred to, and order all of their products from within a single application electronically. Additionally, these electronic procurement applications allow buyers to systematically track and approve purchases and allow spending patterns to be analyzed.

In another conventional order-processing system, a customer may place an order for a configurable product via a method such as the Internet. For example, if a company desires to purchase a complex product, a user will first access a web site for a company that sells the product. The web site may allow the user to build a product according to selected specifications, in other words, to configure the product. For example, the user will configure a computer with 128 megabytes of RAM, 20 megabyte hard drive, selected software, etc. Some conventional systems will screen the order to determine whether it is configured properly. For example, a set of rules will be run to determine whether there is enough memory for the selected software, etc. Additionally, the system will test whether all of the shipping and billing information was properly provided. If not, the order will be flagged and not allowed to be further processed until the problem has been corrected. Unfortunately, flagging errors may delay processing of the order. For example, if the person placing the order does not know the shipping address the order is delayed.

In many business-to-business scenarios, the order must be approved by someone other than the person placing the order. For example, the engineer who configures the product may not have authority to approve the order, as it may be a very expensive order. Consequently, later a manager or purchasing agent will approve the order. Unfortunately, some conventional systems do not let an order go from the configure stage to the approve stage without having all the order information filled in. Thus, delays may occur.

Some conventional systems that allow for ordering configurable products make frequent updates to the rules that determine valid product configurations. For example, by providing for frequent rule changes, the customer will be assured of always getting the proper software updates and fixes, and will not order products that are at the end-of-life. Some conventional systems will force the user to perform a configuration check for every line in an order if such rule updates have occurred. For example, a rule change may cause a line on an order to be set to "unverified". This will force the user to run a configuration check. However, in most cases, the configuration check would pass if run. Thus, the user is forced to waste time running unnecessary steps. In other cases, the order will be flagged as an invalid configuration. However, the manager who is approving the order will not know how to fix the product configuration problem. Consequently, the company will have to have the engineer log into the web site again and configure a new product. Then, the order waits for management approval. In theory, an order could go through the approval chain again and again. Thus, a manager may be asked to approve an order for the same product more than once. Thus, order processing is complicated. Furthermore, the consequential delay in shipping the order may cause the customer to lose revenue and/or delay production.

Therefore, it would be advantageous to provide a method for allowing an electronically placed order for a configurable product to be automatically processed without delay. What is still further needed is a method which simplifies order processing for the customer and does not require unnecessary multiple order approvals. What is still further needed is a method for processing order for configurable products with frequent rule changes regarding allowable configurations.

SUMMARY OF THE INVENTION

The present invention provides a method for automatically processing electronically placed orders for configurable products. The present invention provides a method for allowing an electronically placed order for a configurable product to be automatically processed without delay. The present invention provides a method that allows an order for a configurable product that is properly configured but is missing some order processing information to be processed without delay. The present invention provides a method of allowing an Internet placed order to continue to be automatically processed even if rules that are used to check for valid product configuration change between the order date and approval date, so long as it was valid on the order creation date. The present invention provides a method that simplifies order processing for the customer.

A method for automatically processing electronic customer orders for configurable products is disclosed. In one embodiment, a web site that is operable to access a vendor ordering application receives a user who is electronically transferred from a web site that is operable to access an electronic procurement application. Next, the vendor ordering application allows the creation of an electronically placed order for a configurable product. The vendor ordering application determines whether the product is configured properly; however, the order will be allowed to proceed even if all of the required order processing information is not yet provided. The vendor ordering application then transfers an electronic copy of the incomplete order to the electronic procurement application. Next, the vendor application receives an approval for the order, along with the rest of the required order processing information. At this point, the vendor ordering application determines whether the required order processing information is complete and valid. If less than a pre-determined period of time has expired between the time the order was placed and the time the order was approved, the vendor application automatically continues the processing of the order, without rechecking the product configuration. If more than a pre-determined period of time has passed, the vendor ordering application determines whether the product configuration is still valid and rejects the order if invalid.

In another embodiment the electronic procurement application runs on a customer's computer. Thus, the customer does not access the web site for the electronic procurement application. Instead, the customer is electronically transferred to the vendor web site from the customer's computer.

These and other advantages of the present invention will no doubt become obvious to those of ordinary skill in the art after having read the following detailed description of the preferred embodiments which are illustrated in the various drawing figures.

DETAILED DESCRIPTION OF THE INVENTION

In the following detailed description of the present invention, a method for expediting orders placed in a multi-vendor environment, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Multi-Vendor Integration Process for Internet Commerce

Figure 1A:
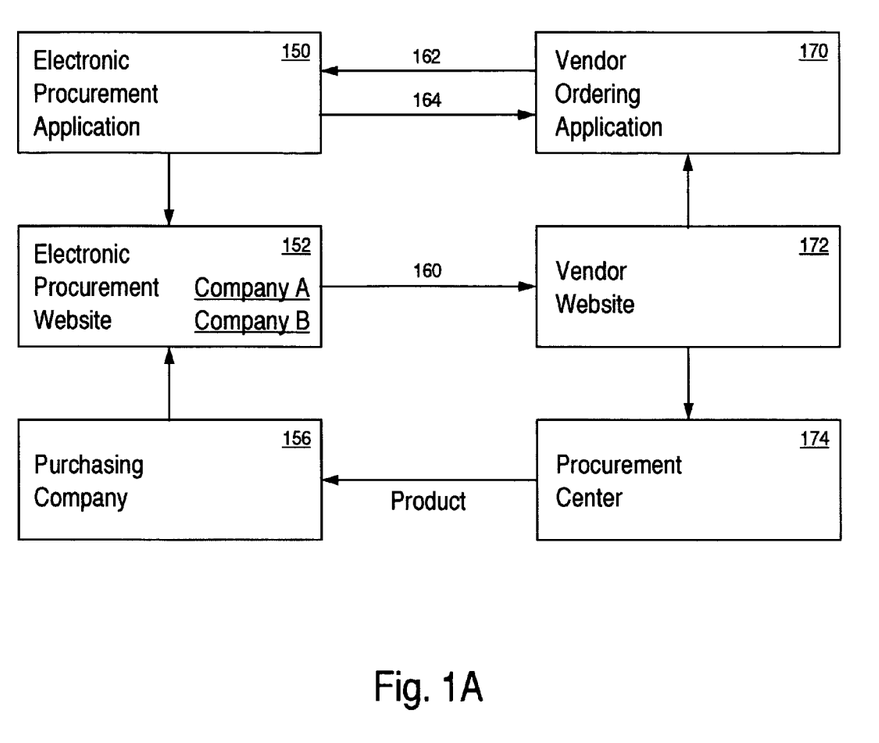
FIG. 1A is a logical block diagram of an electronic order processing system, in which an embodiment of the present invention may be practiced.

The present invention provides for a method for automatically processing electronically placed orders. FIG. 1A illustrates a system including an electronic procurement application 150 that may be running on a general-purpose computer 100, such as the one in FIG. 4. When the user at a purchasing company 156 wishes to place an order, the user accesses the electronic procurement application 150 via its web site 152. Once there, the user is allowed to select from numerous companies to place orders. For example, the user will select Company A and be electronically transferred 160 to a vendor web site 172 for Company A. This vendor web site 172 provides the user with access to a vendor ordering application 170, which may be running on a general purpose computer 100.

Still referring to FIG. 1A, the user may select which features are desired for the product, in the present embodiment. For example, the user may configure a router with a particular chassis, a selected amount of memory, selected software, etc. After the user is finished configuring the product, the user may return to the web site 152 for the electronic procurement application 150 and select another company or quit. Additionally, an electronic message 162 is sent from the vendor ordering application 170 to the electronic procurement application 150. This message contains information regarding the order just placed. In this fashion, the electronic procurement application 150 may provide the user with information related to all purchases made through it. Additionally the user may later return to the electronic procurement web site 152 to complete an order. For example, the user may provide missing shipping information or give a needed order approval. In one embodiment, the approval, along with information to compete the order, is electronically transferred 164 from the electronic procurement application 152 to the vendor ordering application 172. In another embodiment, the user is electronically transferred 160 to the vendor web site 170 to make the approval, and complete the order information, if necessary. It is also possible for the user to make changes in the order (e.g., to update the desired configuration) and to make several amendments to the order before eventually approving the order.

After the order has been approved, the vendor ordering application 170 will forward the order to a procurement center 174 for further processing. The procurement center 174 may be, for example, a manufacturing site, warehouse, or the like. The order is then shipped to the customer.

Figure 1B:
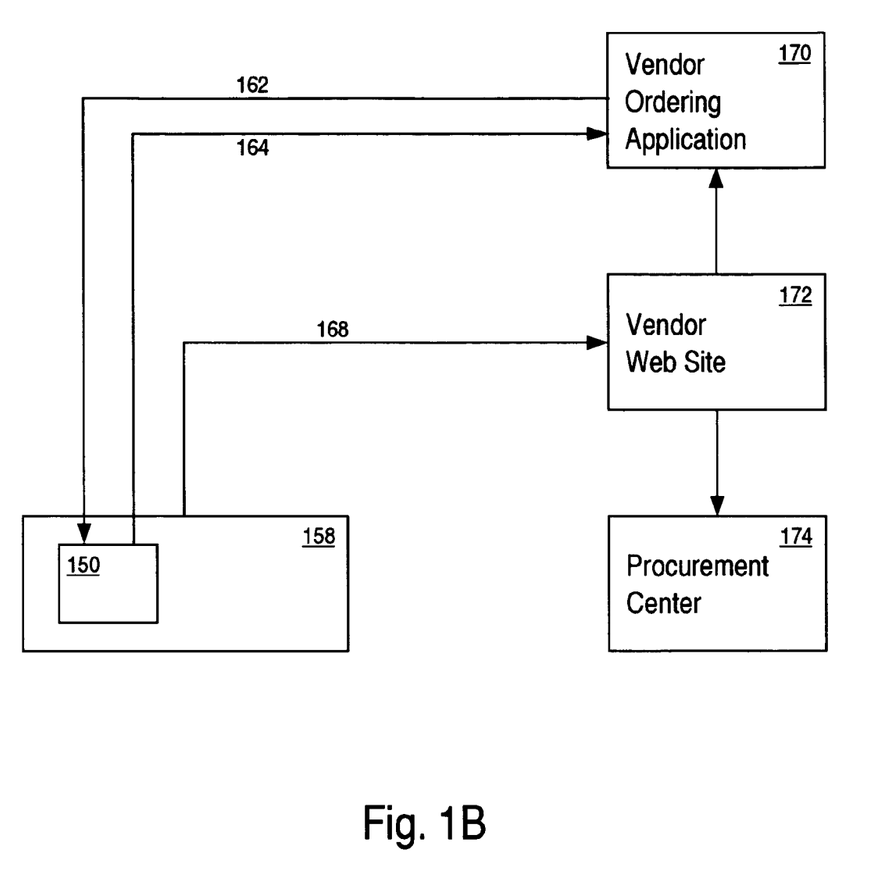
FIG. 1B is a logical block diagram of an alternate embodiment electronic order processing system of FIG. 1A, in which an embodiment of the present invention may be practiced.

The user does not have to access the electronic procurement web site 152 to access the electronic procurement application 150 or the electronic vendor web site 172. Referring to FIG. 1B, the user runs the electronic procurement application 150 from a desktop computer 158 or other computing platform. The user is electronically transferred 168 from the electronic procurement application 150 to the vendor web site 172. Once there, the user may again configure products according to desired specifications. After the vendor ordering application 170 allows the user to create the order, an electronic message 162 containing order information is transferred back to the user. In this embodiment, the approval may be electronically transferred 164 from the desktop 158 to the vendor ordering application 170.

Figure 2:
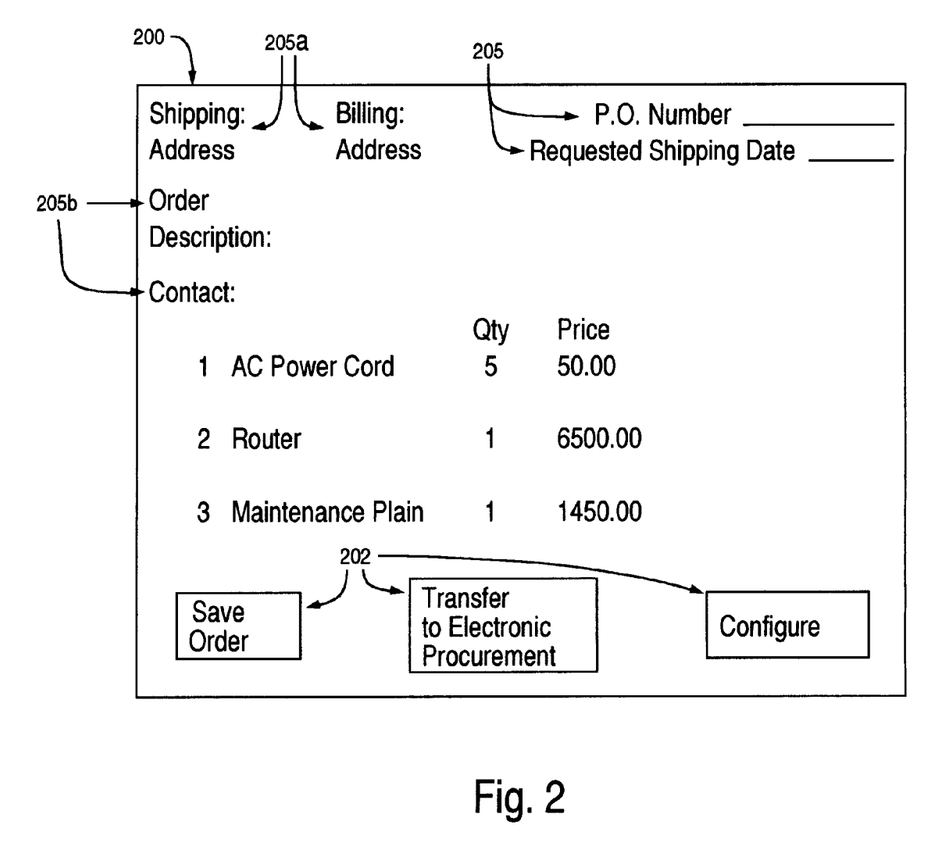
FIG. 2 is an exemplary order form, which is used in embodiments of the present invention.

FIG. 2 illustrates an exemplary order form 200 made available by the vendor ordering application 170, in one embodiment. Line item 1 is for an AC power cord and is not configurable, as there are no user selectable features for this product. Line item 2 is for a router and is configurable, as the user may select which features are desired. Throughout this application the term product configuration will mean the various elements, features, and characteristics, etc. that a product has. For example, a user may configure a router by selecting: a chassis, type and amount of memory, software, etc. By allowing the product to be configured, the present invention allows for more flexibility than merely selecting products from a catalog of un-configurable products.

The exemplary order form 200 also has a number of fields 205. Some are required fields 205a such as, for example, billing address and shipping address. Throughout this application the term required order processing information will mean information that the vendor ordering application 170 requires at some point in order to complete the ordering process. By requiring selected information, orders may be expeditiously processed with minimal or no manual intervention. This information may include, but is not limited to, shipping address, billing address, etc. The order 200 may have fields for optional information 205b, as well. For example, the order description field, which allows the user to describe the order 200 to facilitate its identification, is optional. The contact field, which allows for a phone number or e-mail address, is also optional 205b. The present invention is well suited to a wide variety of required 205a and optional 205b fields. The vendor ordering application 170 may be programmed with desired fields 205 of the order form 200 required.

The exemplary order form 200 also includes 'buttons' 202 for saving the order and transferring the order 200 to the electronic procurement application 150 from which the user was electronically transferred 160. It will be understood that an actual order form 200 may contain many more fields 205 for both required 205a and optional 205b information. There may also be a button 202 to run a configuration check.

While the present embodiment describes a configurable product, the present invention is also well suited to configurable services. For example, a user may select from a number of possible service contracts for a product. The vendor ordering application 170 will then check that the particular service contract chosen is valid. For example, the service must be valid for the customer, product, etc.

Figure 3A:
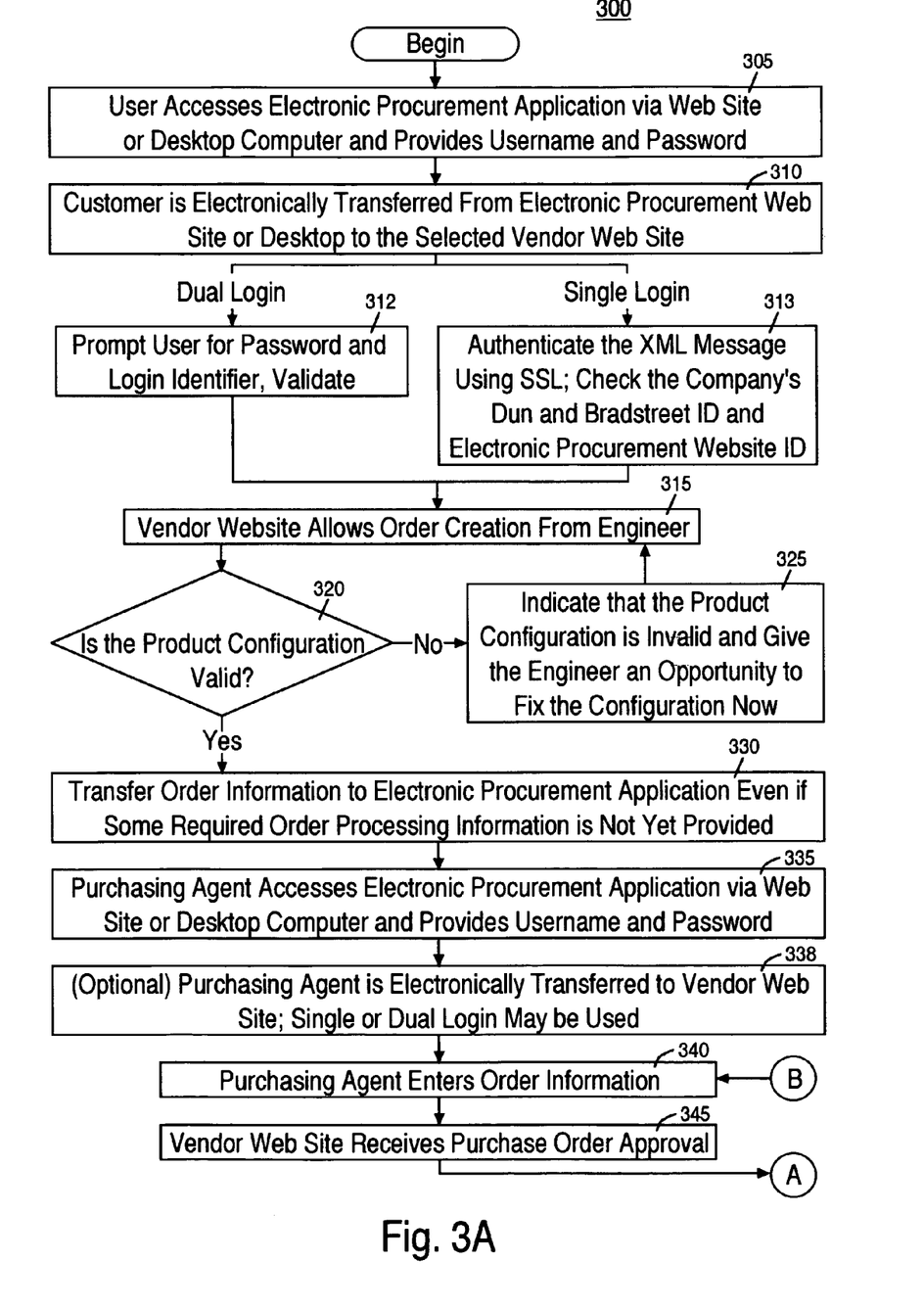
FIG. 3A and FIG. 3B illustrate a flowchart of the steps of a process of expediting electronically placed orders in a multi-vendor environment, according to an embodiment of the present invention.
Figure 3B:
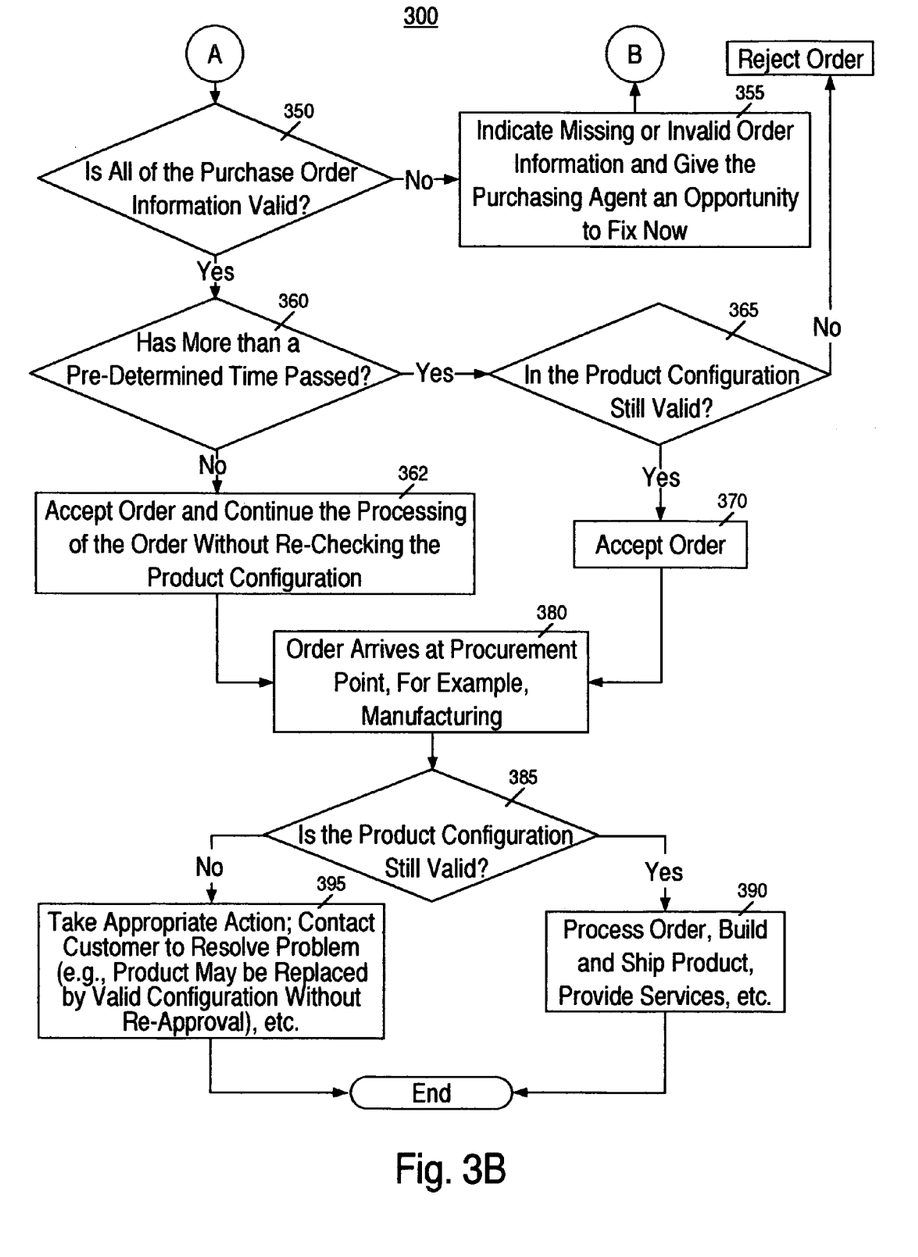

Referring now to FIG. 3, a process 300 for expediting electronically placed orders 200 for configurable products will be discussed. The steps of the process 300 may be implemented on a general-purpose computer 100 such as the one in FIG. 4. In step 305, a customer accessing an electronic procurement application 150. This may be accomplished by logging in to a web site 152 for an electronic procurement application 150. Alternatively, the user may have the electronic procurement application 150 running on a computer 158. In either embodiment, the user may be prompted for a user name and password at this time.

In step 310, the user selects which vendor web site 172 to purchase products and/or services from and is electronically transferred 160 to a vendor web site 172. In one embodiment, the user is electronically transferred 160 from the electronic procurement web site 152. Alternatively, the user is electronically transferred 160 from a desktop 158 or other electronic device, which is able to access the Internet.

The company that is purchasing from the vendor ordering application 170 may decide to use either single or dual login. Assuming dual login is selected, step 312 will be taken, in which the user is prompted for a user identification and password after being transferred to the vendor web site 172. This option allows a purchasing company the ability to have multiple user identifiers within the company. Therefore, the access to the vendor web site 172 and application 170 may be tailored according to the particular user. For example, certain groups in the purchasing company 156 may only be able to purchase service plan "A".

Alternatively, if the purchasing company 156 selects the single login option, then step 313 is taken. In this step, the vendor ordering application 170 will authenticate an Extensible Markup Language (XML) message from the electronic procurement web site 152 using Secure Socket Layer (SSL) protocol. Additionally, the purchasing company's Dun and Bradstreet Identification (Duns ID) and electronic procurement web site identifications will both be verified.

In step 315, the vendor ordering application 170 allows creation of an electronically placed order 200 from an engineer. In this embodiment, the product is configurable to user specification as described herein.

In step 320, the vendor ordering application 170 determines whether the product configuration is valid. For example, the vendor may sell products for which many valid configurations exist, thus allowing the user the flexibility to select desired features. However, not all possible configurations are valid. The rules that determine whether a product configuration is valid change over time.

In the event the product configuration is invalid, in step 325, the vendor ordering application 170 will so indicate. Thus, the engineer will be provided an opportunity to re-configure the product at this time. Consequently, order 200 processing is not delayed.

If the product is configured properly, a copy of the order 200 is electronically transferred 162 to the electronic procurement application 150, in step 330. The transfer is allowed even if some required order processing information is not yet provided. For example, the engineer may not know the shipping address. Thus, the order processing is allowed to proceed without delay.

After the engineer places the order 200, the company 156 may have a purchasing agent approve the order 200, and complete the order processing information, if necessary. In step 335, purchasing agent accesses the electronic procurement application 150 to complete and approve the order 200. This step may take place, for example, several days after the order 200 is created. The electronic procurement application 150 may be accessed via a web site 152 or desktop computer 158. In either embodiment, the purchasing agent may be prompted for a user name and password at this time.

The purchasing agent may be electronically transferred 160 directly to the vendor web site 172 to complete and approve the order 200, in step 338. However, this step is optional. In this step, the agent will be prompted for another user identification and password, if dual login is being used by the company.

In step 340, the purchasing agent enters the required order processing information to complete the order 200, along with any desired optional information. Additionally, the agent approves the order 200. This step may occur from the vendor web site 172 or the electronic procurement web site 152.

In step 345, the vendor web site 172 receives the completed and approved order 200. This may come from the electronic procurement application 150 sending an electronic message 164 to the vendor application, in the event step 338 was not taken.

Next, in step 350, the vendor ordering application 170 determines whether all the required order processing information has been provided and if it is valid. Both required 205a and optional 205b order processing information may be checked for validity. For example, the contact information may be an optional field 205b that is checked for validity, in one embodiment. If the customer chooses to provide a phone number or e-mail address, it may be checked for validity and the order 200 flagged if invalid. If no information is provided for an optional field 205b, no validation check is done. If source of truth conflicts arise, any suitable method may be used to resolve them. In one embodiment, data which was entered from a user accessing the electronic procurement application web site 152 will take precedent over data entered at the vendor web site 172.

If the required order processing information is not valid or missing, this is so indicated at this time, in step 355. In this fashion, the purchasing agent may fix the problem, in step 340.

In one embodiment, the rules that are used to determine whether a product is configured correctly change frequently. This allows the benefit of providing the highest quality products with the latest features. In step 360, the vendor ordering application 170 checks to see whether a predetermined period of time has passed since the order 200 was created and the order 200 was approved.

If less than the pre-determined time has passed, the vendor ordering application 170 accepts the order 200 and there is no additional product configuration check done at this time, in step 362. This allows the customer time to get through the approval process without having to take the trouble to check configuration information line by line. For example, some conventional systems require that the user take extra steps of going to multiple entries in the order 200 and hit an update button to run a configuration check. The present embodiment allows the order 200 to continue to be processed without any need for a configuration check at this step. There is a small chance that an order 200 will be allowed to proceed even though it will later be determined to be an invalid configuration. However, the tradeoff saves the customer from having to run unnecessary configuration checks.

If, however, more than a pre-determined period of time has passed since the order 200 was created and it was approved, a new configuration check will be performed, in step 365. In one embodiment, the pre-determined time is eight days. This number is an adjustable parameter, in one embodiment. For example, based on customer feedback and an analysis of the typical time it takes for order 200 to get through the chain of approval, along with factors such as the frequency and impact of rule changes affecting the configuration check, the pre-determined time will be adjusted.

If the configuration check of step 365 fails, then suitable action is taken, in step 368. In one embodiment, the user is so notified at this time so that the configuration process may be fixed by the appropriate person in the ordering company. For example, the purchasing agent has the engineer who placed the order 200 do so again.

If the product configuration is still valid after the predetermined period has expired, the order 200 is accepted, in step 370.

After accepting the order 200, whether from step 362 or step 370, the order 200 arrives at the procurement point 174, in step 380. For example, this may be manufacturing where a router is built according to customer specifications, although other procurement sites are possible.

In step 385, the product configuration will be checked at this time to determine whether it is still valid. If the order 200 reaches this stage shortly after the last product configuration check, it need not be checked again.

Should the configuration check of step 385 pass, the order 200 is built and shipped, in step 390. Additionally, the services the customer ordered are processed.

If the configuration check of step 385 fails, the customer is so notified, in step 395. This may occur, for example, if the configuration became invalid after the product was ordered, in step 315. To resolve the problem, the customer may be sent an e-mail or may be called, etc. As an example, the software that the customer ordered may have been replaced by a new version to fix a bug. It will not always be necessary for the order 200 to go through the customer approval process again.

The present invention may also be practiced in a stand-alone version, without the electronic procurement application 150. In this embodiment, the user will log directly into the vendor web site 172 and configure a product order 200. Again, the purchasing agent may return and complete the order 200 several days later.

Figure 4:
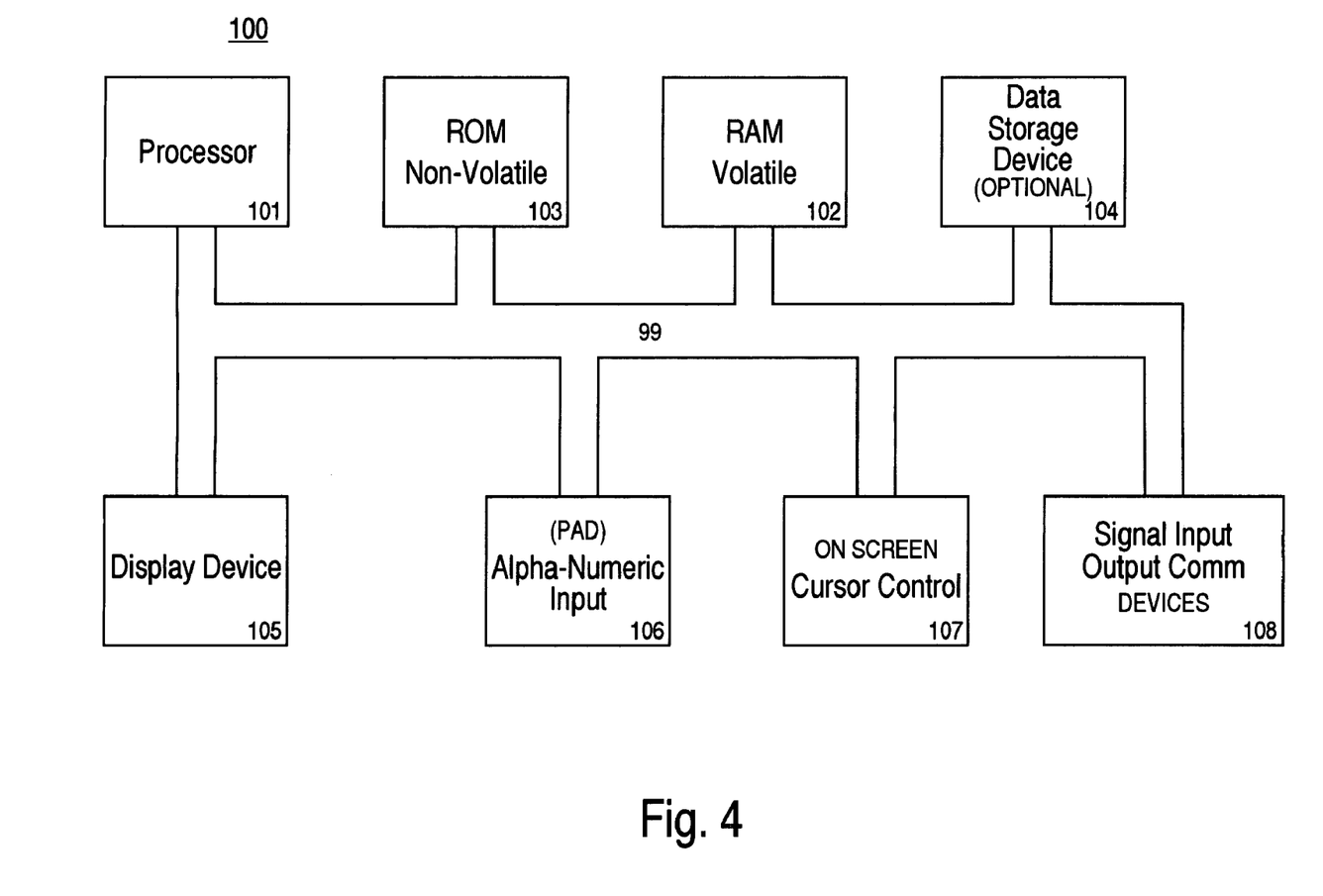
FIG. 4 is a schematic of a computer system, which may form a platform upon which to practice embodiments of the present invention.

FIG. 4 illustrates circuitry of host computer system 100, which may form a platform upon which to perform an embodiment of the present invention. Computer system 100 includes an address/data bus 99 for communicating information, a central processor 101 coupled with the bus for processing information and instructions, a volatile memory 102, (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 coupled with the bus 99 for storing information and instructions.

Also included in computer system 100 of FIG. 4 is an optional alphanumeric input device 106. Device 106 can communicate information and command selections to the central processor 101. For example, customer orders may be entered with device 106. System 100 also includes an optional cursor control or directing device 107 coupled to the bus 99 for communicating user input information and command selections to the central processor 101. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Signal communication device 108, also coupled to bus 99, can be a serial port.

The preferred embodiment of the present invention, a method for automatically processing customer orders in a multi-vendor environment, is thus described. While the present invention has been described in particular embodiments, it should be appreciated that the present invention should not be construed as limited by such embodiments, but rather construed according to the below claims.

We claim:

1. A computer-implemented method of processing an electronically placed order that requires valid configuration and approval, said method comprising:
   receiving an electronically placed order comprising a first valid product configuration, wherein validity of product configuration is based on rules that change over time;
   accepting an approval for the order regardless of whether said order is still a valid configuration if less than a pre-determined period of time has expired between said receiving the order and said approval for the order;
   rejecting said order if more than the pre-determined period of time has expired between said receiving the order and the approval and if said first product configuration is invalid due to changes to said rules, wherein said pre-determined time is based on frequency and impact of changes to said rules;
   after said accepting said approval, determining that said first product configuration is invalid due to changes to said rules;
   after said determining, receiving a second valid product configuration that complies with said rules with said changes; and
   maintaining said acceptance of said approval after said receiving the second valid product configuration, wherein processing of said order is completed based on said approval that was received prior to said receiving said second valid configuration.

2. The method of claim 1, wherein said accepting the approval comprises accepting said approval at a time when said first product configuration is invalid due to said changes to said rules.

3. The method of claim 1 further comprising altering a parameter specifying said pre-determined period of time.

4. The method of claim 1 wherein said pre-determined period of time is based on an expected amount of time for said order to be approved.

5. The method of claim 1 wherein said electronically placed order further comprises fields for required order processing information.

6. The method of claim 5 wherein said accepting the approval is conditioned upon determining whether all said required order processing information has been provided.

7. The method of claim 6 wherein said accepting the approval is further conditioned upon determining whether all said required order processing information is valid.

8. The method of claim 5 wherein said receiving the electronically placed order comprises allowing said order to proceed without all said required order processing information.

9. The method of claim 1 wherein said receiving the order comprises receiving said order via an Internet.

10. A system for automatically processing an electronically placed order, comprising:
    means for receiving an electronically placed order, said order comprising a first valid product configuration, wherein validity of product configuration is based on rules that change over time;
    means for accepting an approval for the order regardless of whether said order is still a valid configuration if less than a pre-determined period of time has expired between said receiving the order and said approval for the order;
    means to reject said order if more than the pre-determined period of time has expired between said receiving the order and the approval and if said first product configuration is invalid due to changes to said rules, wherein said pre-determined time is based on frequency and impact of changes to said rules;
    means for determining that said first product configuration is invalid due to changes to said rules after said accepting said approval;
    means for receiving a second valid product configuration that complies with said rules with said changes after said determining; and
    means for maintaining said acceptance of said approval after said receiving the second valid product configuration, wherein processing of said order is completed based on said approval that was received prior to said receiving said second valid configuration.

11. The system of claim 10, wherein said means for accepting the approval comprises means for accepting said approval at a time when said first product configuration is invalid due to said changes to said rules.

12. The system of claim 10, further comprising means for rejecting said order if more than the pre-determined period of time has expired between said receiving the order and the approval and if said first product configuration is invalid due to changes to said rules.

13. The system of claim 10, further comprising means for altering a parameter specifying said pre-determined period of time.

* * * * *